(12) United States Patent
Kichline, Jr. et al.

(10) Patent No.: US 9,487,148 B2
(45) Date of Patent: *Nov. 8, 2016

(54) CARGO TRUCK MULTI-STAGE EXTENDABLE PERSONNEL PLATFORM WITH FOLDABLE GUARDRAIL

(71) Applicant: ROM Acquisition Corporation, Belton, MO (US)

(72) Inventors: John L. Kichline, Jr., Pen Argyl, PA (US); Timothy D. Robertson, Easton, PA (US)

(73) Assignee: ROM Acquisition Corporation, Belton, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/218,491

(22) Filed: Mar. 18, 2014

(65) Prior Publication Data

US 2015/0224936 A1 Aug. 13, 2015

Related U.S. Application Data

(63) Continuation-in-part of application No. 14/179,979, filed on Feb. 13, 2014.

(60) Provisional application No. 61/767,897, filed on Feb. 22, 2013.

(51) Int. Cl.

| B60R 3/02 | (2006.01) |
|---|---|
| E06C 5/02 | (2006.01) |
| B60R 3/00 | (2006.01) |
| B60N 3/02 | (2006.01) |
| B63B 27/14 | (2006.01) |

(52) U.S. Cl.
CPC ............... *B60R 3/02* (2013.01); *B60R 3/002* (2013.01); *B60N 3/02* (2013.01); *B60N 3/023* (2013.01); *B60R 3/00* (2013.01); *B60R 3/005* (2013.01); *B60R 3/007* (2013.01); *B63B 27/14* (2013.01); *E06C 5/02* (2013.01)

(58) Field of Classification Search
None
See application file for complete search history.

(56) References Cited

U.S. PATENT DOCUMENTS

| 3,796,456 | A | * | 3/1974 | Bergeson | B60R 3/02 |
|---|---|---|---|---|---|
| | | | | | 182/88 |
| 4,180,143 | A | * | 12/1979 | Clugston | 182/91 |
| 4,347,638 | A | * | 9/1982 | Weaver | B60R 3/02 |
| | | | | | 14/71.1 |
| 4,720,116 | A | * | 1/1988 | Williams et al. | 280/166 |
| 5,228,707 | A | * | 7/1993 | Yoder | 280/166 |
| 5,586,374 | A | * | 12/1996 | Nishida | 24/599.8 |
| 6,058,875 | A | * | 5/2000 | Krish, Jr. | 114/362 |
| 6,213,486 | B1 | * | 4/2001 | Kunz et al. | 280/166 |
| 6,264,222 | B1 | * | 7/2001 | Johnston et al. | 280/166 |

(Continued)

*Primary Examiner* — S. Joseph Morano
*Assistant Examiner* — Hilary L Johns
(74) *Attorney, Agent, or Firm* — Wei Wei Jeang; Grable Martin Fulton PLLC

(57) ABSTRACT

A personnel platform for installation on a cargo truck comprises a mounting bracket securely fastened to a framing structure of the cargo truck beneath a personnel door, a platform deck mounted to a sliding mechanism securely fastened to the mounting bracket, wherein the platform deck is operable to be slidably configured in a stowed position beneath the cargo truck and a deployed position extending substantially horizontally beyond the cargo truck, and a latching mechanism operable to lock the platform deck in one of the stowed position and the deployed position. The platform further includes a guardrail accessory that may be stowed under the platform deck as well as a multi-step stair accessory that may be stowed under the platform deck.

16 Claims, 17 Drawing Sheets

(56) References Cited

U.S. PATENT DOCUMENTS

| | | | | |
|---|---|---|---|---|
| 6,318,301 | B1* | 11/2001 | Jackson et al. | 119/772 |
| 6,425,572 | B1* | 7/2002 | Lehr | 256/1 |
| 6,880,843 | B1* | 4/2005 | Greer, Jr. | 280/166 |
| 7,025,174 | B1* | 4/2006 | Hawley | 182/88 |
| 7,168,722 | B1* | 1/2007 | Piotrowski et al. | 280/166 |
| 7,344,482 | B2* | 3/2008 | Checketts | A63B 1/00 482/111 |
| 7,469,915 | B2* | 12/2008 | Horn | E06C 9/08 182/127 |
| 2003/0127284 | A1* | 7/2003 | Cook | B63B 27/146 182/86 |
| 2009/0184486 | A1* | 7/2009 | Kircher | 280/166 |
| 2009/0184487 | A1* | 7/2009 | Kircher | 280/166 |
| 2010/0181741 | A1* | 7/2010 | Webb | 280/166 |
| 2010/0264618 | A1* | 10/2010 | Agoncillo et al. | 280/166 |
| 2011/0133426 | A1* | 6/2011 | Coochesfahani | 280/166 |
| 2014/0027592 | A1* | 1/2014 | Kusiak | 248/231.91 |
| 2014/0239609 | A1* | 8/2014 | Robertson | B60R 3/02 280/166 |
| 2014/0311826 | A1* | 10/2014 | Beardman | E06C 7/46 182/107 |

* cited by examiner

US 9,487,148 B2

CARGO TRUCK MULTI-STAGE EXTENDABLE PERSONNEL PLATFORM WITH FOLDABLE GUARDRAIL

RELATED APPLICATION

This patent application is a Continuation-In-Part application of U.S. Non-Provisional patent application Ser. No. 14/179,979 filed on Feb. 13, 2014, entitled "Cargo Truck Multi-Stage Extendable Personnel Platform," which claims the benefit of U.S. Provisional Patent Application Ser. No. 61/767,897, entitled "Cargo Truck Extendable Personnel Platform," filed on Feb. 22, 2013.

FIELD

The present disclosure primarily relates to an extendable personnel platform with a foldable guardrail for a cargo truck and other vehicles.

BACKGROUND

According to the United States Department of Transportation, over twelve thousand million tons of freight were transported by trucks in the United States in 2010. The trucking industry provides an essential service to the American economy by transporting large quantities of raw materials, works in process, and finished goods over land—typically from manufacturing plants to retail distribution centers. Some cargo trucks are equipped with a side personnel door for ease of access to the cargo compartment.

DESCRIPTION OF THE DRAWINGS

The present disclosure describes various embodiments illustrated in the drawing figures in which like reference numerals refer to like parts throughout the various views unless otherwise specified.

DETAILED DESCRIPTION

The present disclosure is directed to a multi-stage extendable personnel platform with a foldable guardrail for temporary installation on a cargo truck to permit personnel to easily access the compartment and cargo through the body side door and enable staging cargo for delivery. The mounting envelope of the platform, the ladder and foldable guardrail accessories is small enough to allow the entire unit to be mounted underneath the cargo body of straight trucks (body on frame construction) in addition to trailers. Since the unit is designed for under-body mounting it does not require extensive body structure or floor modifications and may be installed as an accessory item as well as being able to be offered as truck or trailer original equipment.

Figure 1A:
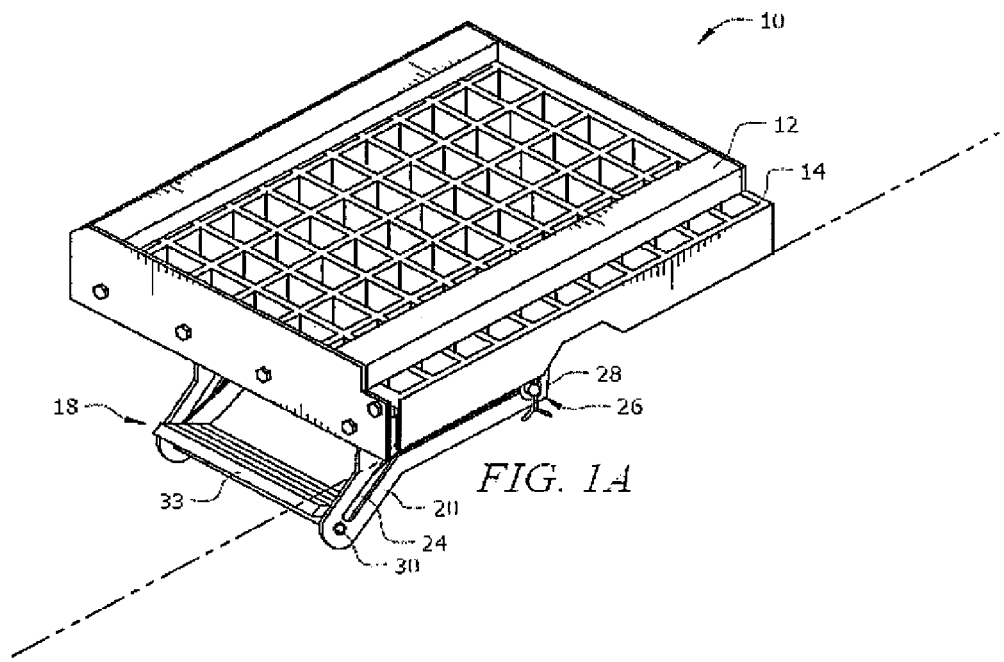
FIGS. 1A-1C are perspective views of the deployment of a preferred embodiment of a multi-stage extendable personnel platform according to the teachings of the present disclosure.
Figure 1B:
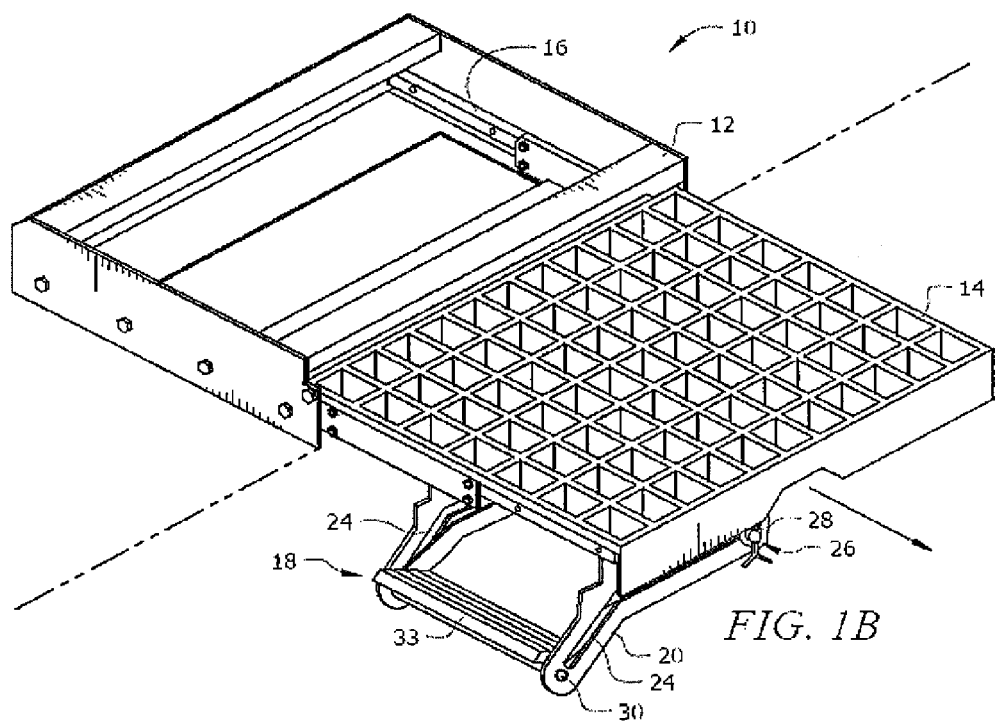
Figure 1C:
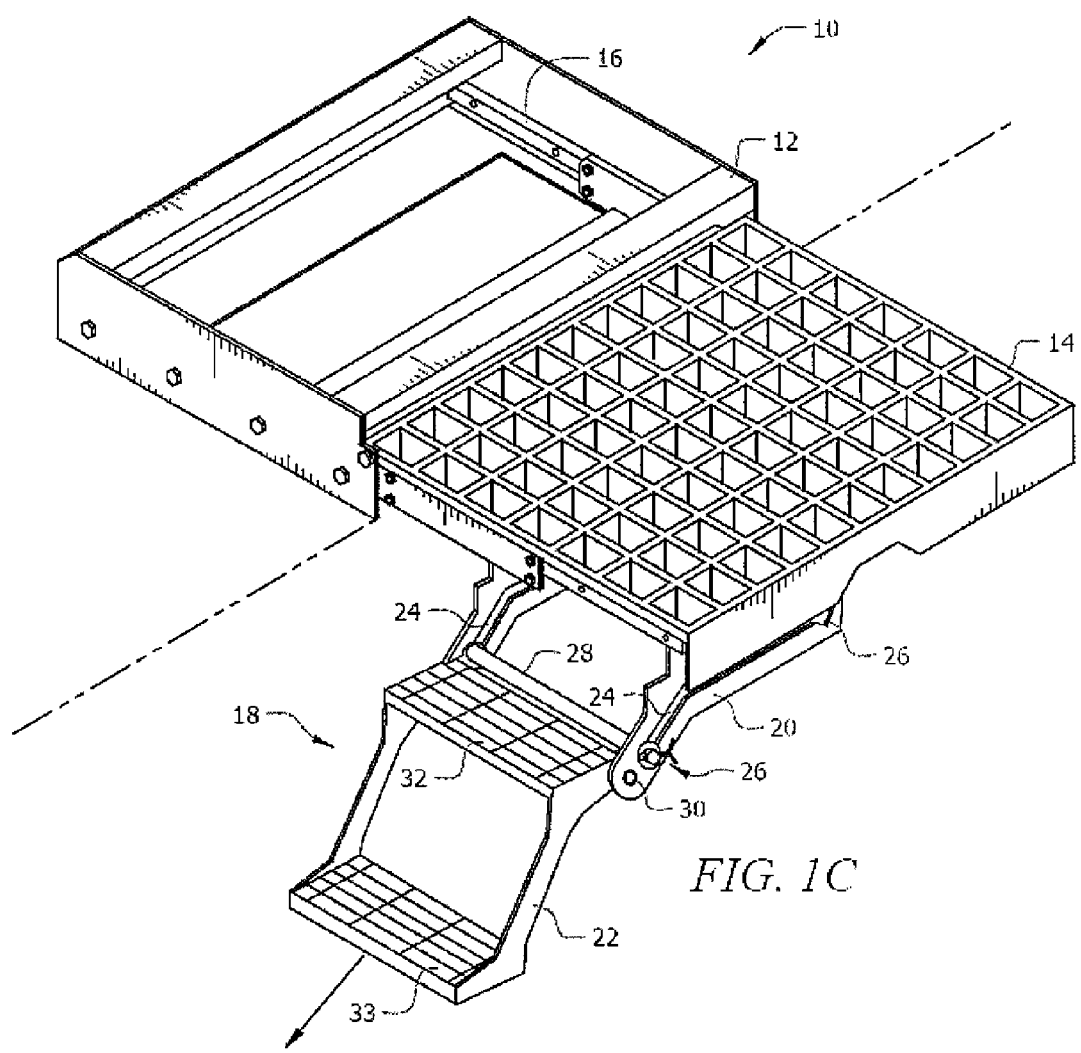

FIGS. 1A-1C are perspective views of the deployment of a preferred embodiment of a multi-stage extendable personnel platform 10 according to the teachings of the present disclosure. The multi-stage extendable personnel platform 10 includes a mounting bracket 12 that is mounted to a cargo truck. The mounting bracket 12 is adapted to be mounted to the frame or other rigid structures under the body of a cargo truck. The platform 10 is designed to be installed under a side door sill and truck body cross bar. The platform mounting envelope is sized to be easily accommodated within the existing framework of the truck body so that no substantial alteration to the trailer is needed. The mounting bracket 12 accommodates a deck 14 that is mounted to a sliding mechanism 16 of the mounting bracket 12. The sliding mechanism 16 enables the deck 14 to be within the mounting bracket 12 under the truck body in a stowed position, and slide out from the mounting bracket 12 in the fully-extended deployed position. Any suitable sliding mechanism using sturdy sliding rails, bearings, etc. may be used. The sliding mechanism 16 is mounted to the mounting bracket 12 that securely fastens the platform 10 to the truck body framing structure. A latching mechanism to be described in more detail below is used to engage and lock the platform deck 14 in either position.

The multi-stage extendable personnel platform 10 may be equipped with a ladder accessory 18. The ladder accessory 18 includes a mount 20 that may be securely bolted underneath the deck 14. A ladder is slidably engaged in the slots 24 defined in the side rails 22 to enable the ladder to be stowed under the deck 14 or be fully-extended and lowered for use. The slots 24 define a detent 26 into which a first crossbar 28 of the ladder rests while it is stowed. The first crossbar 28 is slidably engaged with the slots 24 to enable the ladder to be stowed or extended. The first crossbar 28 may be securely engaged in the slots 24 using cotter pins or other suitable means. A second crossbar 30 securely fastened across the lower end of the side rails 22 supports the ladder and prevents further rotation about the first crossbar 28 when the ladder is in the fully-extended position.

Figure 2:
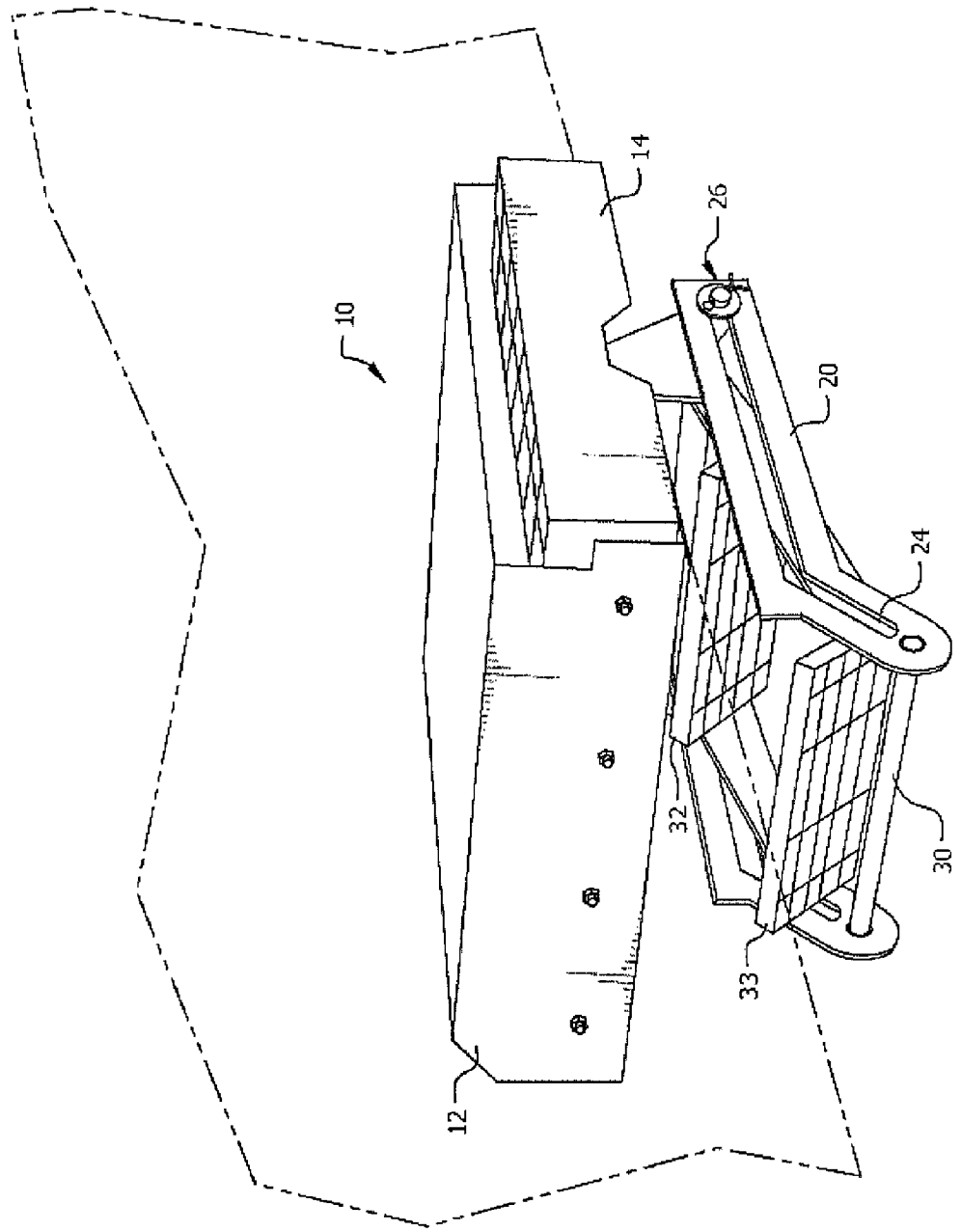
FIG. 2 is another perspective view of a preferred embodiment of a multi-stage extendable personnel platform according to the teachings of the present disclosure.

FIG. 1A shows the platform 10 in the fully-stowed position, FIG. 1B shows the deck 14 to be fully-deployed in the extended position, and FIG. 1C shows a two-step ladder accessory 18 mounted under the deck 14 in the fully-extended and lowered position. FIGS. 1A-1C shows a two-step ladder accessory with steps 32 and 33. FIG. 2 is another perspective view of a preferred embodiment of the multi-stage extendable personnel platform 10 with a two-step ladder accessory in the fully-stowed position. It may be seen in these figures that the deck and ladder steps are preferably constructed with a non-slippery configuration or material, such as aluminum, steel, and fiberglass. Alternatively, the deck and ladder steps may be surfaced with slippery resistant coatings to reduce or eliminate the risk of falls.

Although the ladder accessory is shown to extend and deploy along an axis perpendicular to the deployment axis of the personnel deck, other configurations are also contemplated. Such as configuring the ladder accessory extension to be along the same axis as the platform deck, or providing a mount for the ladder accessory that can be pivoted or rotated to different angles relative to the personnel platform for ease of use in tight or awkward spaces.

Figure 3:
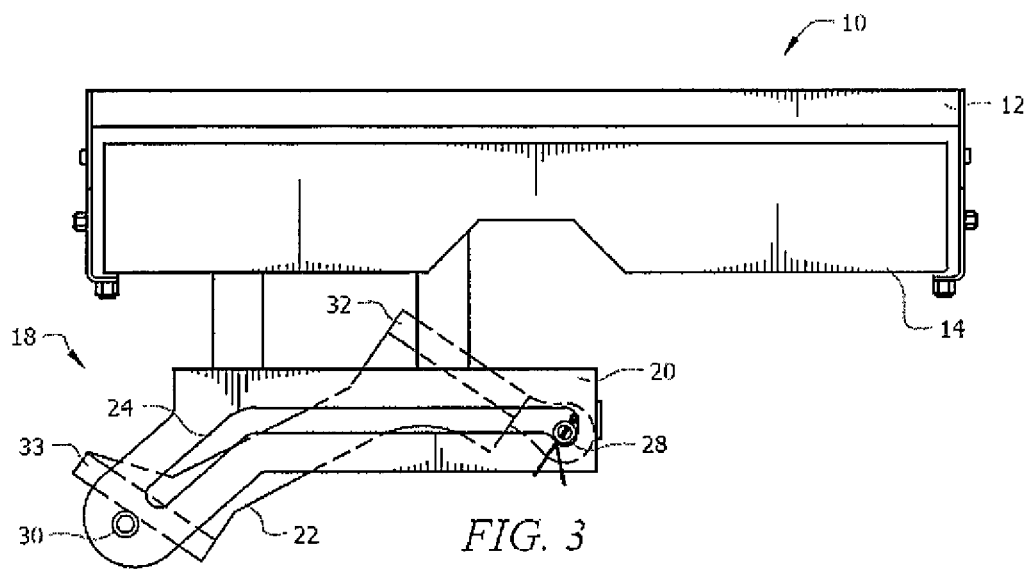
FIG. 3 is a side view of a preferred embodiment of a multi-stage extendable personnel platform equipped with a two-step ladder accessory in the stowed position according to the teachings of the present disclosure.
Figure 5:
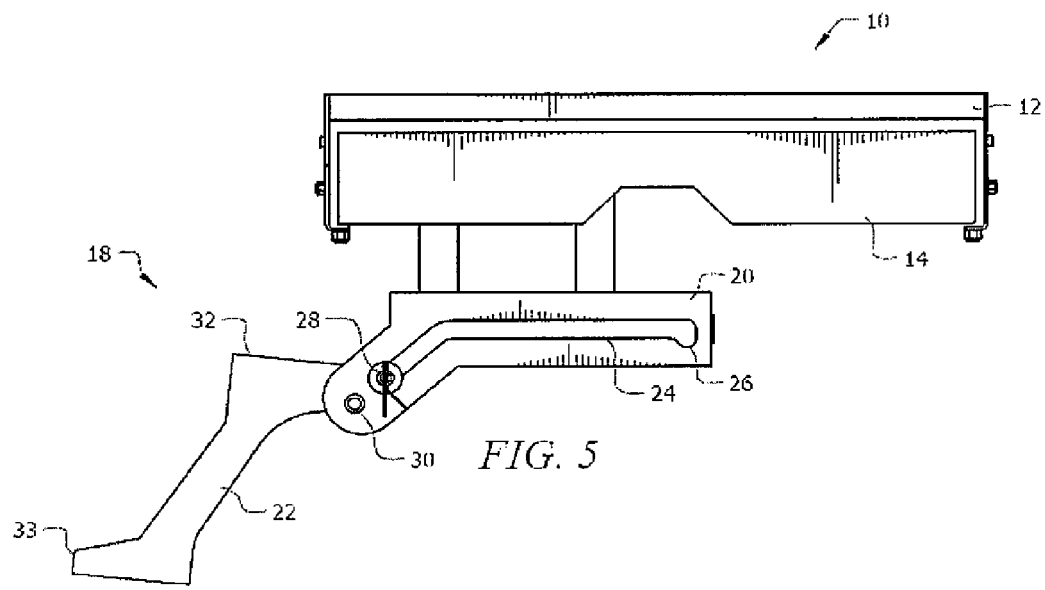
FIG. 5 is a side view of a preferred embodiment of a multi-stage extendable personnel platform equipped with a two-step ladder accessory in the fully-deployed position according to the teachings of the present disclosure.

FIG. 3 is a side view of a preferred embodiment of the multi-stage extendable personnel platform 10 equipped with the two-step ladder accessory 18 in the stowed position according to the teachings of the present disclosure. The platform is preferably installed under the body of a cargo truck beneath a personnel side door. FIG. 5 shows the same two-step ladder accessory 18 in the fully extended position.

Figure 4:
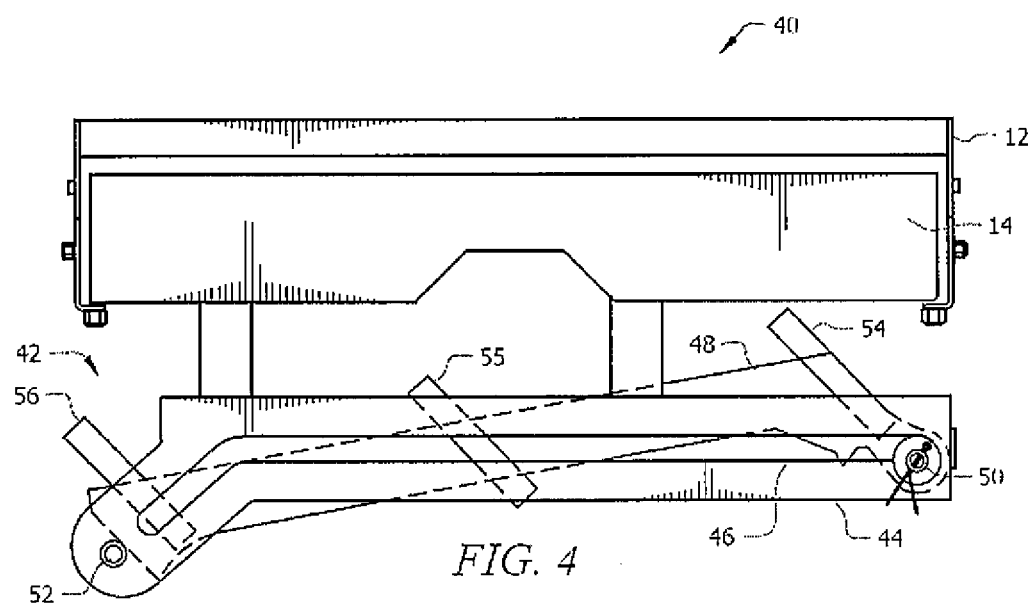
FIG. 4 is a side view of a preferred embodiment of a multi-stage extendable personnel platform equipped with a three-step ladder accessory in the stowed position according to the teachings of the present disclosure.
Figure 6:
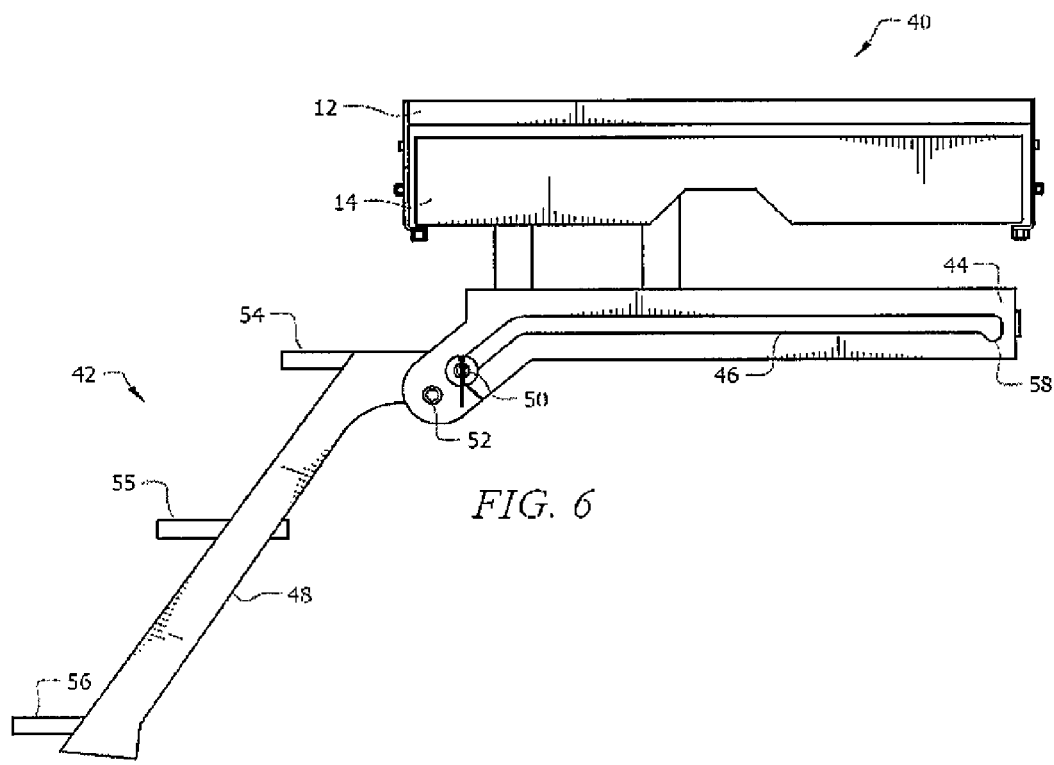
FIG. 6 is a side view of a preferred embodiment of a multi-stage extendable personnel platform equipped with a three-step ladder accessory in the fully-deployed position according to the teachings of the present disclosure.

FIG. 4 is a side view of a preferred embodiment of a multi-stage extendable personnel platform 40 equipped with a three-step ladder accessory 42 in the stowed position according to the teachings of the present disclosure. The ladder accessory 42 includes a mount 44 that may be securely bolted underneath the deck 14. A ladder is slidably engaged in the slots 46 defined in the side rails 48 to enable the ladder to be stowed under the deck 14 or be fully-extended and lowered for use. The ladder includes a first crossbar 50 that is slidably engaged with the slots 46 to enable the ladder to be stowed or extended. A second crossbar 52 securely fastened to the side rails 48 supports the ladder and prevents further rotation about the first crossbar 50 in the fully-extended position. This ladder accessory 42 includes three steps 54-56. FIG. 6 shows the same three-step ladder accessory 42 in the fully extended position. In this view, the detent 58 defined in the slots 46 are clearly visible. The detent 58 serves to catch and retain the first crossbar 50 while the stowed position.

Figure 7:
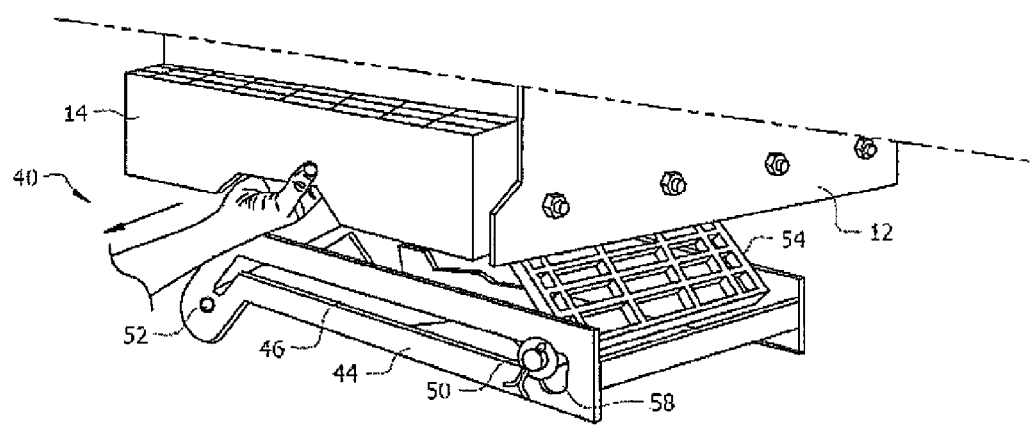
FIGS. 7-10 are various views illustrating the stages of deployment of a preferred embodiment of a multi-stage extendable personnel platform according to the teachings of the present disclosure.
Figure 8:
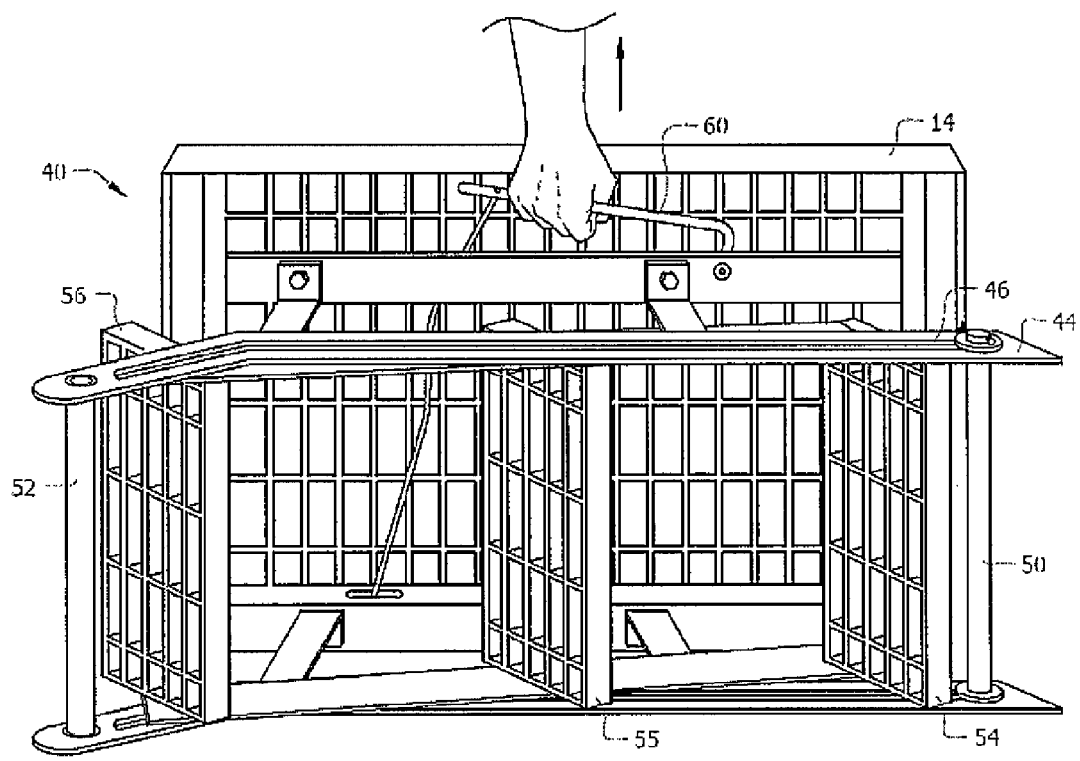

FIGS. 7-10 are various views illustrating the stages of deployment of a preferred embodiment of a multi-stage extendable personnel platform according to the teachings of the present disclosure. The deck 14 can be released and extended by pulling on a lever 60 located under the deck 14. The lever 60 releases a latching mechanism that securely locks the deck 14 in the stowed position while not in use. When the user activates the release lever 60, the deck 14 can be pulled out from the mounting bracket 12 and truck body, as shown in FIGS. 7 and 8. When the deck 14 reaches the fully-extended position, the latch mechanism again securely locks the deck 14 in the extended position, until the user activates the release lever 60 again to return it to the stowed position.

Figure 9:
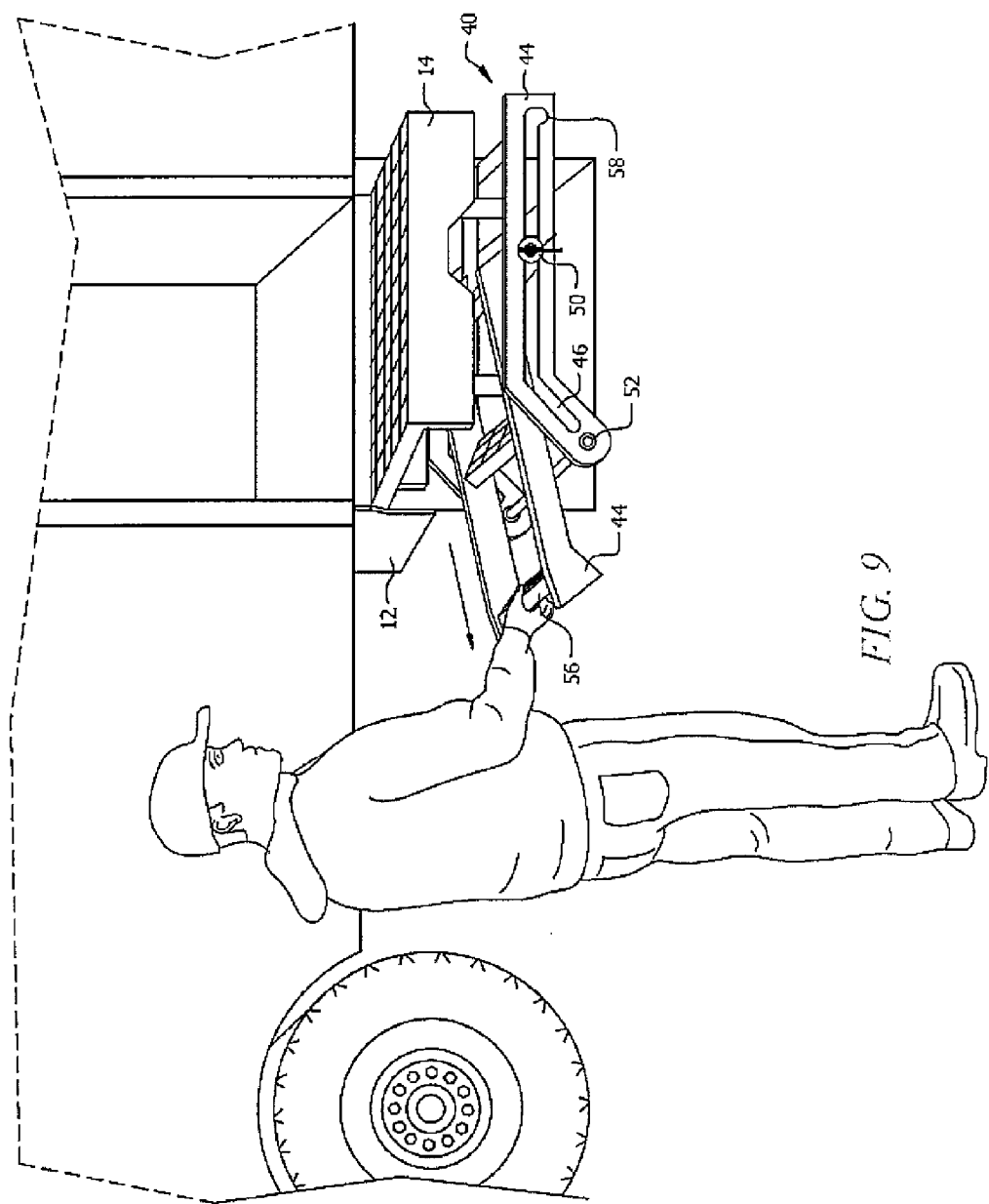
Figure 10:
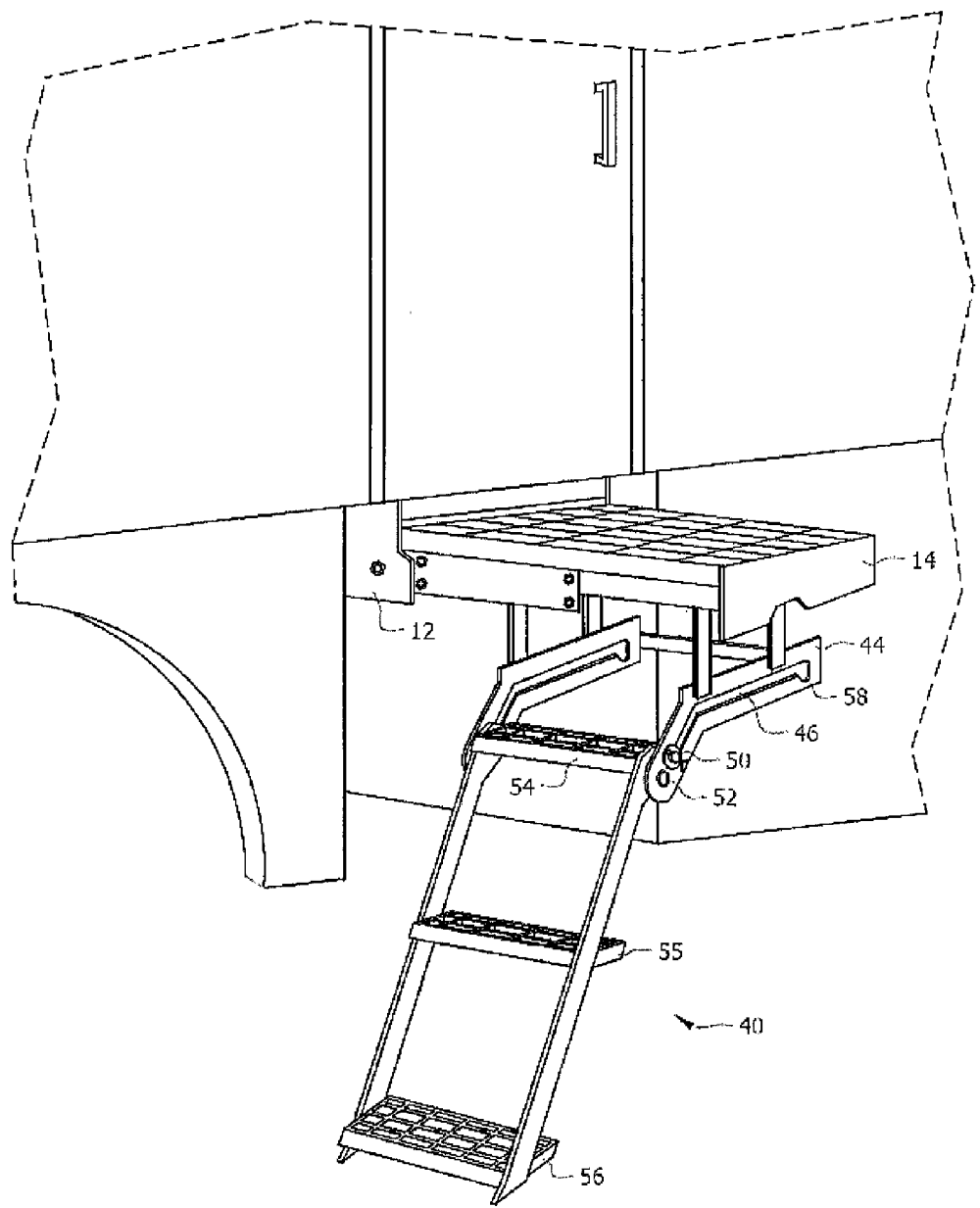

In FIG. 9, the user is shown partially deploying the ladder from under the deck 14 by pulling the ladder so that the first crossbar 50 disengages from the detent 58 and slides along the slots 46 defined in the side rails 44. The user may continue to pull the ladder out from under the deck 14 until the first crossbar 50 reaches the lower end of the slots 46. The user may then lower the ladder and allow it to rest upon the second crossbar 52 disposed across the lower end of the side rails 44. The second crossbar 52 supports the ladder and prevents further rotation about the first crossbar 50 when the ladder is in the fully-extended position.

Figure 11:
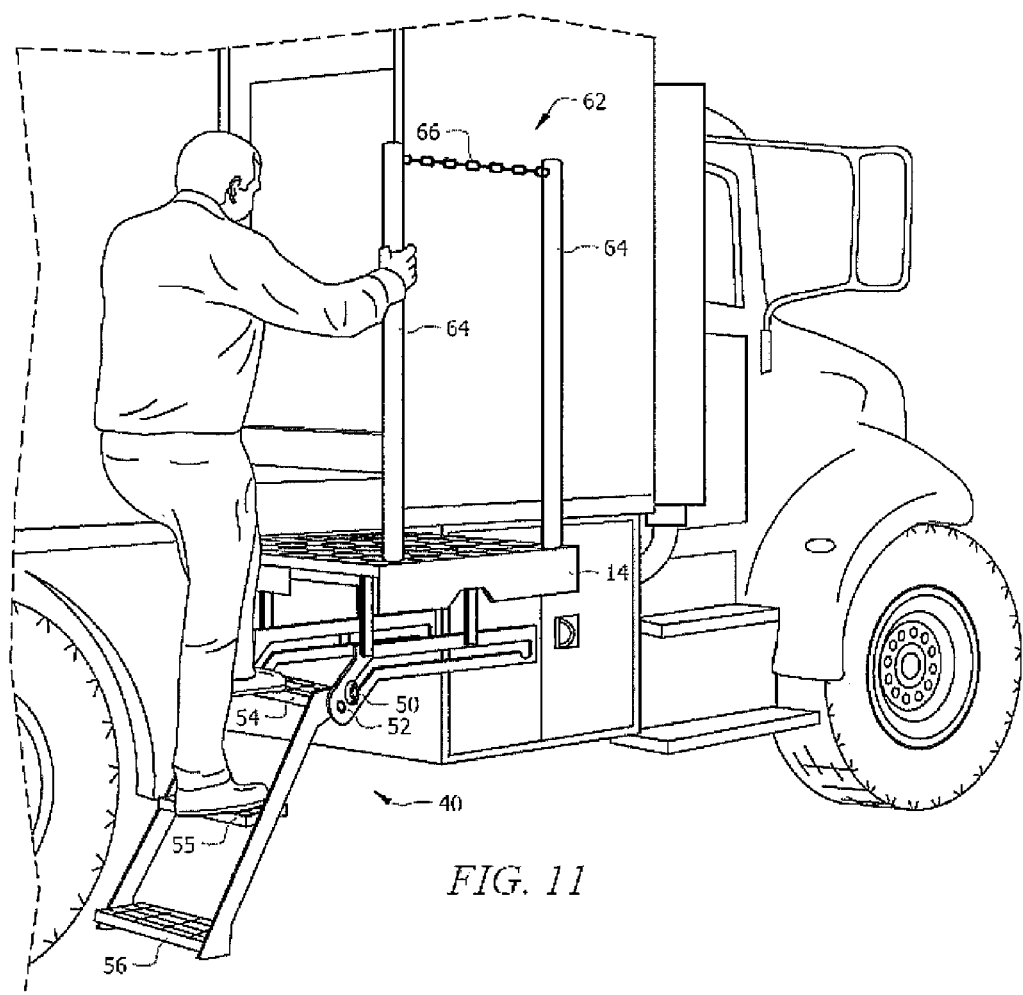
FIG. 11 is a perspective view of a preferred embodiment of a multi-stage extendable personnel platform equipped with a three-step ladder and guard rail accessories according to the teachings of the present disclosure.

FIG. 11 is a perspective view of a preferred embodiment of a multi-stage extendable personnel platform 40 equipped with a three-step ladder and guardrail accessories according to the teachings of the present disclosure. In addition to the ladder accessory, the platform may be equipped with a guardrail accessory 62, one example of which is shown in FIG. 11. Because the platform height may be several feet above ground level, an inadvertent fall from the platform may cause serious injury. Therefore, a guardrail may be temporarily installed as an added safety measure. The guardrail accessory 62 may include one or more vertical posts 64 that can be inserted and securely seated in special openings in the deck 14 after the platform and ladder are fully deployed. Horizontal posts or other forms of support, such as a chain 66 as shown in FIG. 11, form a hand railing between the vertical posts 64. The rail accessory 62 is designed to be easily installed whenever needed, and is adapted to provide lateral support to the user for added safety when needed.

Figure 12:
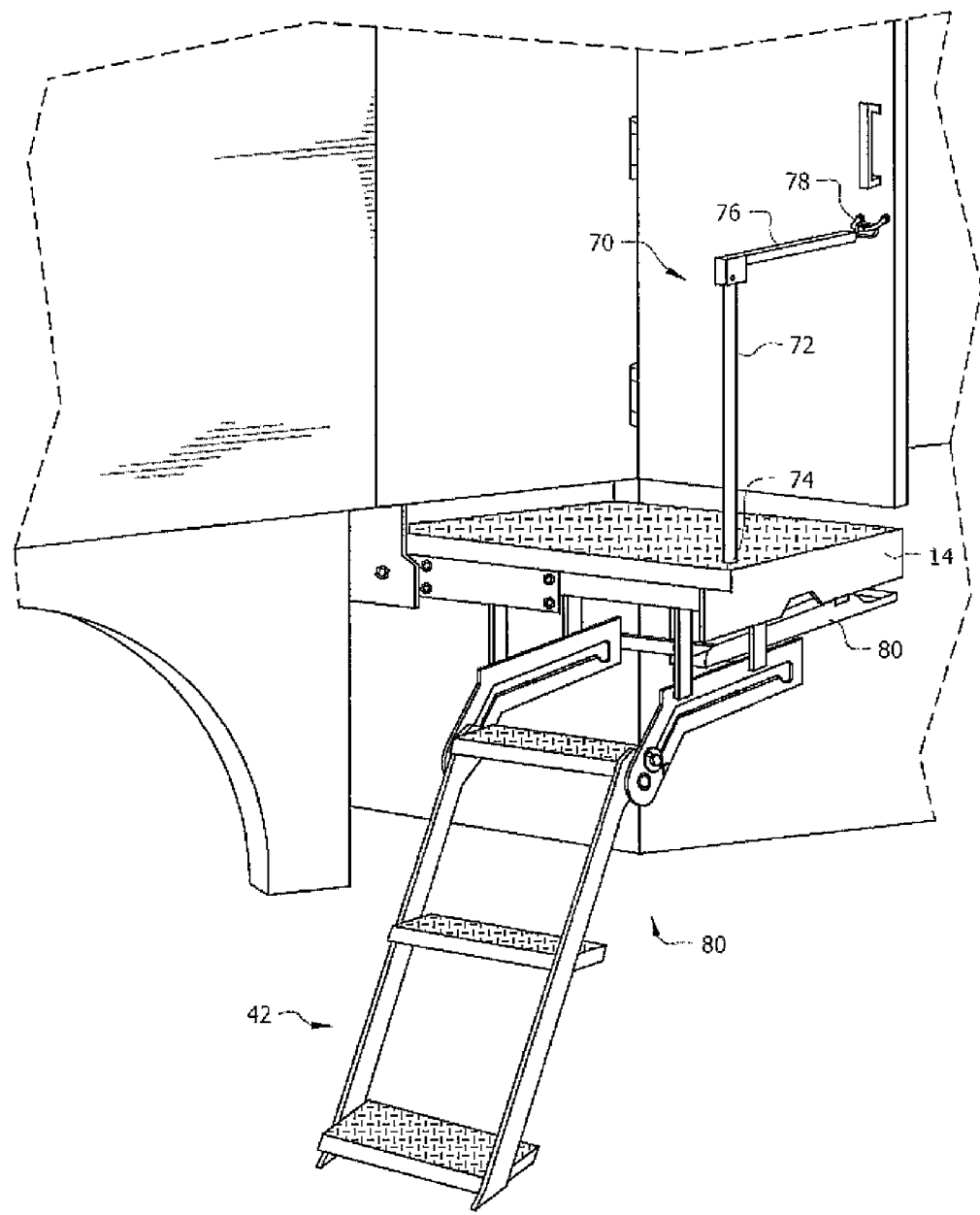
FIG. 12 is a perspective view of a preferred embodiment of a multi-stage extendable personnel platform with a three-step ladder and a foldable guardrail according to the teachings of the present disclosure.

FIG. 12 is a perspective view of a preferred embodiment of a multi-stage extendable personnel platform with a three-step ladder accessory and a foldable guardrail accessory 70 according to the teachings of the present disclosure. In addition to the three-step ladder accessory, the platform 40 may be equipped with a foldable guardrail accessory 70. The foldable guardrail accessory 70 is especially adapted for use with the multi-stage extendable personnel platform 40, but may be used in other applications where a foldable and stowable guardrail is needed. The foldable guardrail 70 may include one or more vertical posts (first elongated member) 72 that can be inserted and securely seated in special openings 74 in the deck 14 after the platform 40 and ladder 42 are fully deployed. A horizontal railing (second elongated member) 76 is rotatably coupled to the vertical post 72 and has a special coupling 78 to securely couple to the personnel door. The foldable guardrail 70 is stowed in a storage tray or housing 80 disposed under the platform 40 when not in use, and is designed to be easily installed whenever needed, and is adapted to provide lateral support to the user for added safety when needed.

Figure 13:
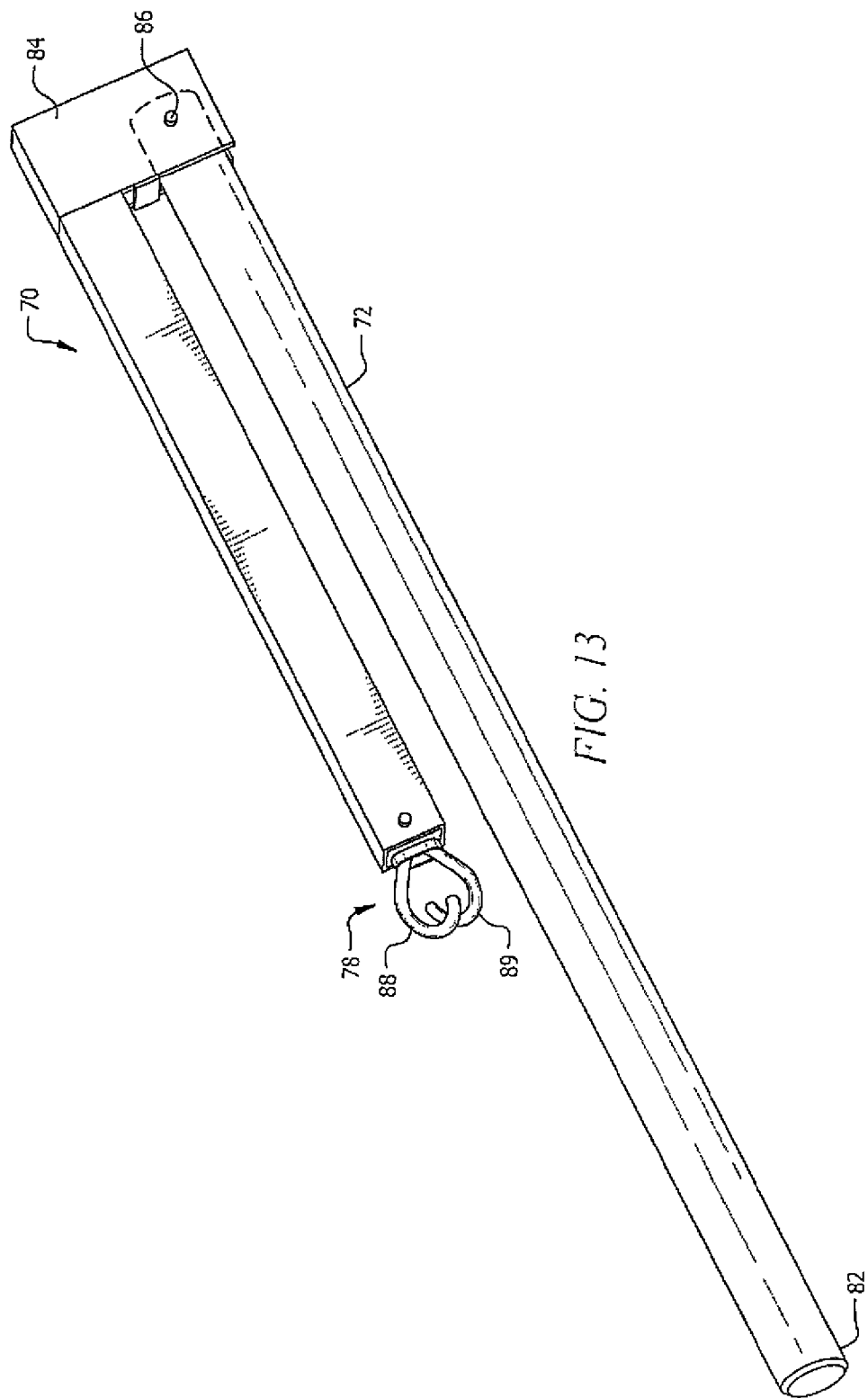
FIG. 13 is a more detailed perspective view of an exemplary embodiment of a foldable guardrail according to the teachings of the present disclosure.
Figure 14:
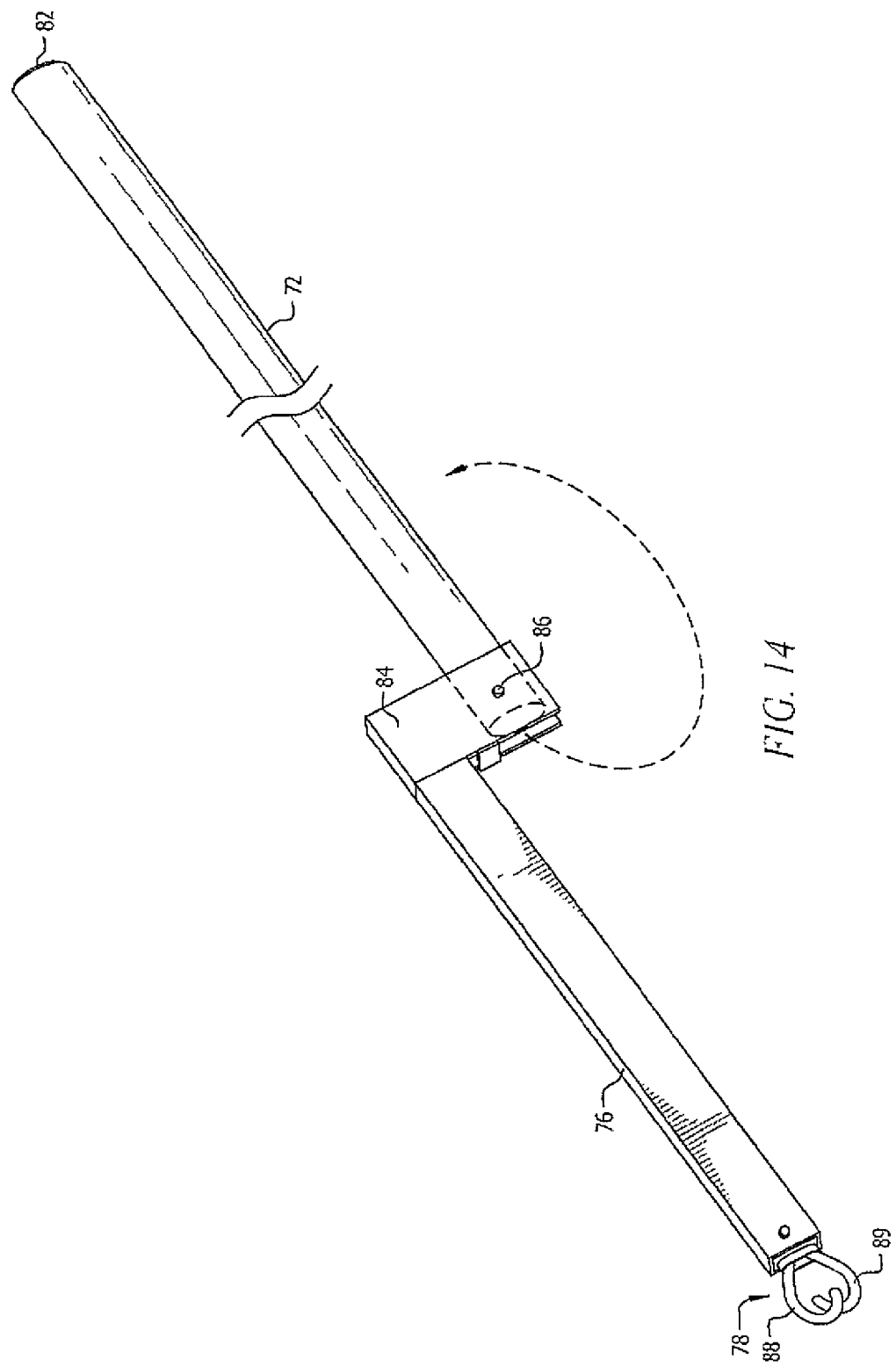
FIG. 14 is a perspective view of an exemplary embodiment of a foldable guardrail illustrating its rotational capability according to the teachings of the present disclosure.

FIG. 13 is a more detailed perspective view of an exemplary embodiment of a foldable guardrail 70 according to the teachings of the present disclosure. The foldable guardrail 70 comprises a post (first elongated member) 72 with one end 82 that is designed to be inserted into a special opening 74 in the platform deck 14, and to stand vertically erect on the platform. The post 72 is coupled to the railing (second elongated member) 76 by a special coupling 84. The post 72 is coupled to the special coupling 84 via a pin 86, which enables the post 72 to rotate up to 180 degrees about the pin 86. Referring also to FIG. 14, the post 72 is shown in its rotated position. As shown in both figures, the post 72 includes a special coupling 78 at its free end. The special coupling 78 comprises two opposed and facing hook members 88 and 89 also shown in FIG. 15.

Figure 15:
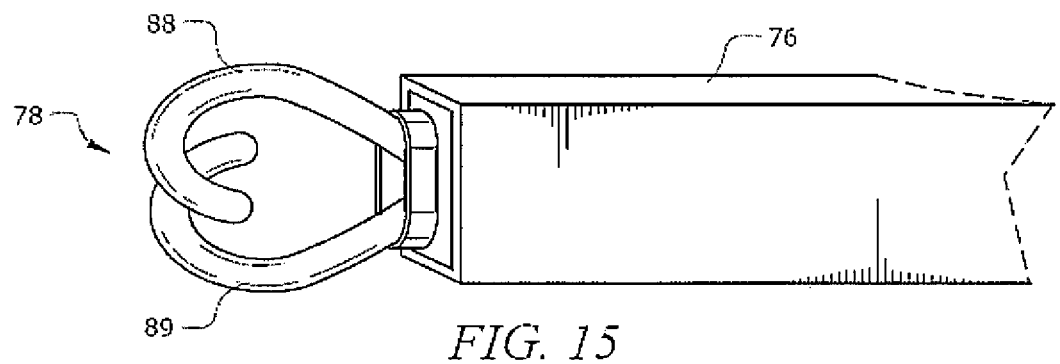
FIGS. 15 and 16 are detailed views of an exemplary embodiment of a coupling of the foldable guardrail according to the teachings of the present disclosure.
Figure 16:
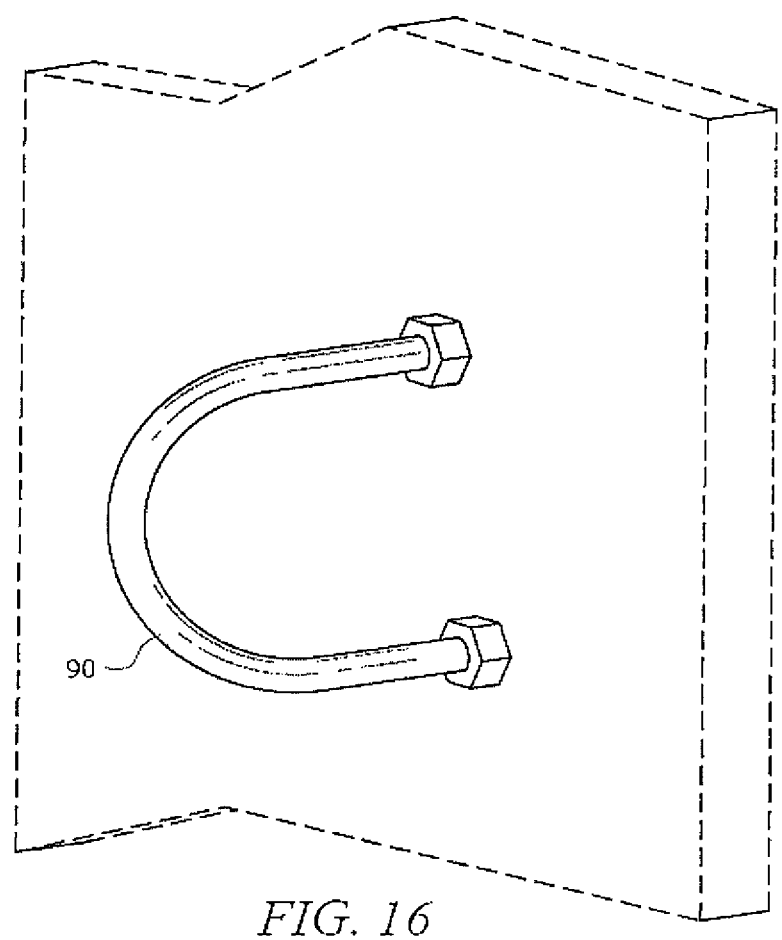
Figure 17:
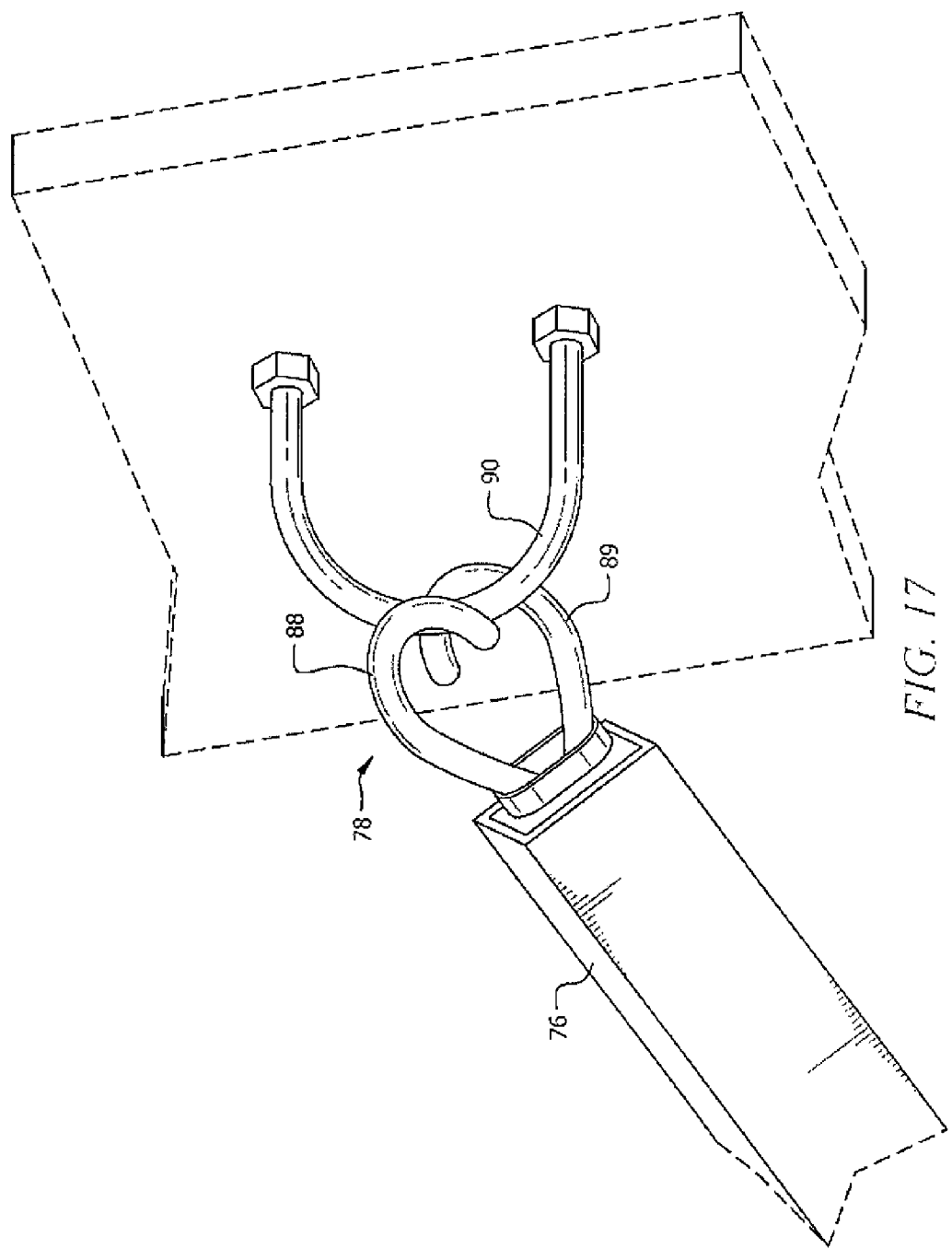
FIGS. 17 and 18 are detailed views of an exemplary embodiment of a coupling of the foldable guardrail in operation according to the teachings of the present disclosure.
Figure 18:
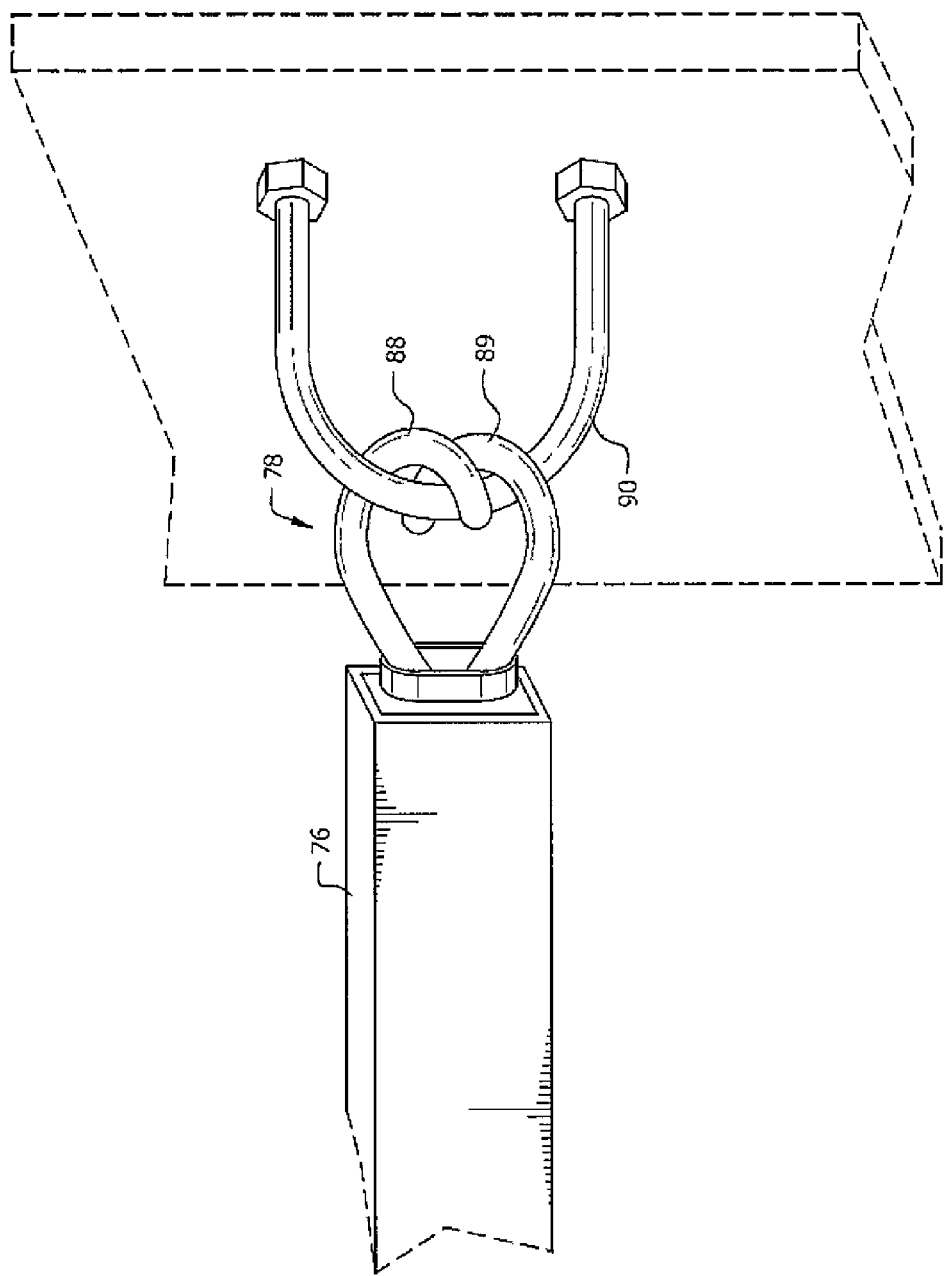

Referring to FIGS. 15-17, The special coupling 78 is designed so that it may quickly connect with an anchor 90 disposed on the personnel door. The anchor 90 may be in the form of a ring secured to the door. The facing hook members 88 and 89 have a spacing therebetween that can easily allow the anchor ring 90 to slip through when the hook members are oriented in alignment with the anchor ring 90. The railing 76 may then be twisted 90 degrees so that the space between the hook members are out of alignment with the anchor ring 90 to fasten the railing to the anchor ring. In this way the railing 76 can be easily secured to the personnel door, as shown in FIG. 18.

Figure 19:
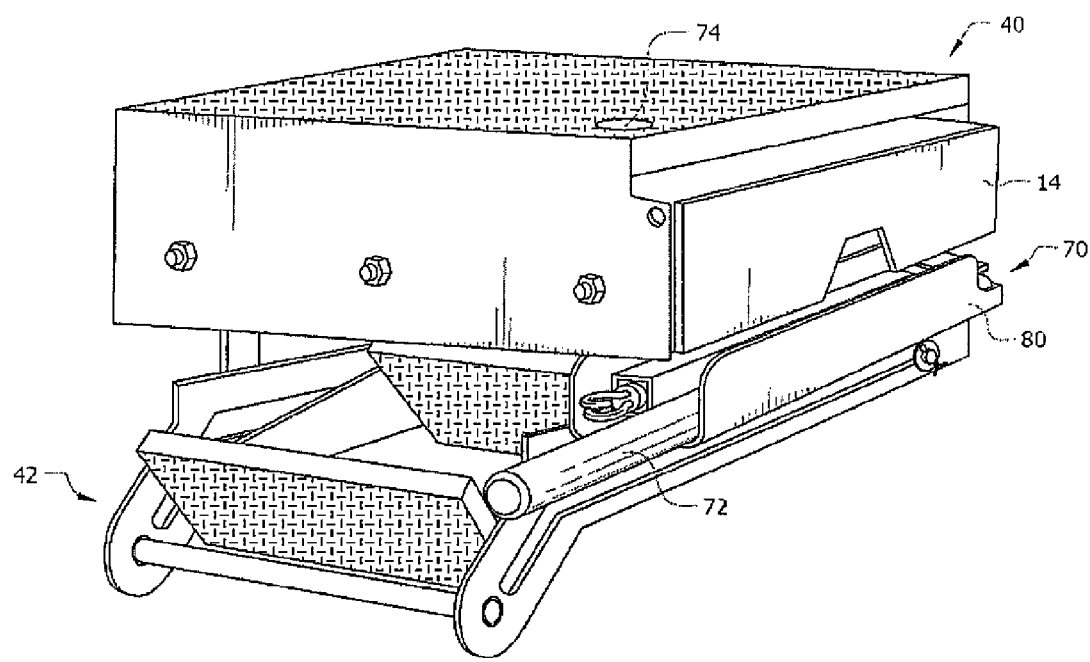
FIGS. 19 and 20 are perspective views of an exemplary embodiment of the foldable guardrail in stowed position under the multi-stage extendable personnel platform according to the teachings of the present disclosure.
Figure 20:
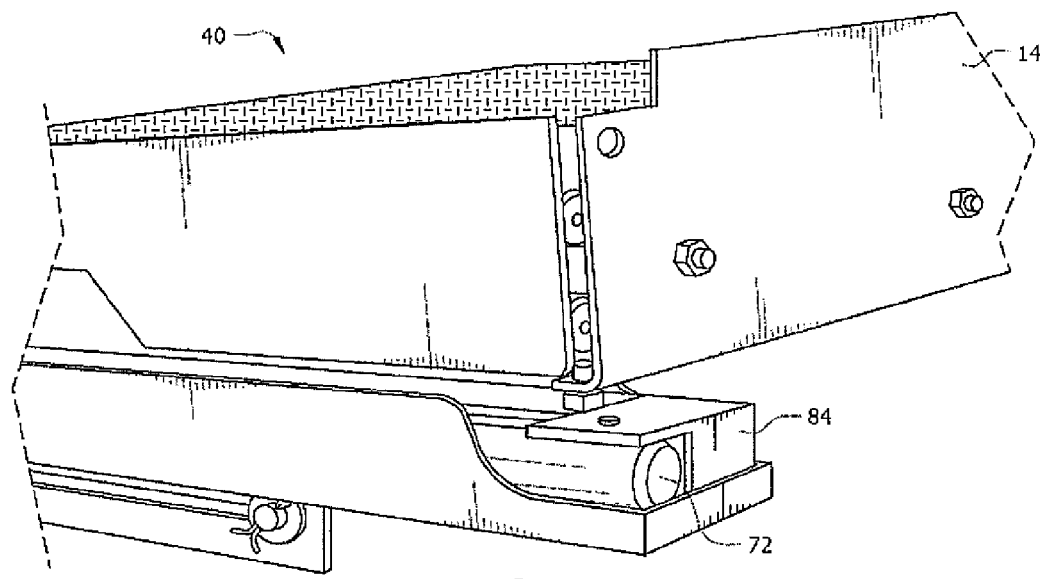
Figure 21:
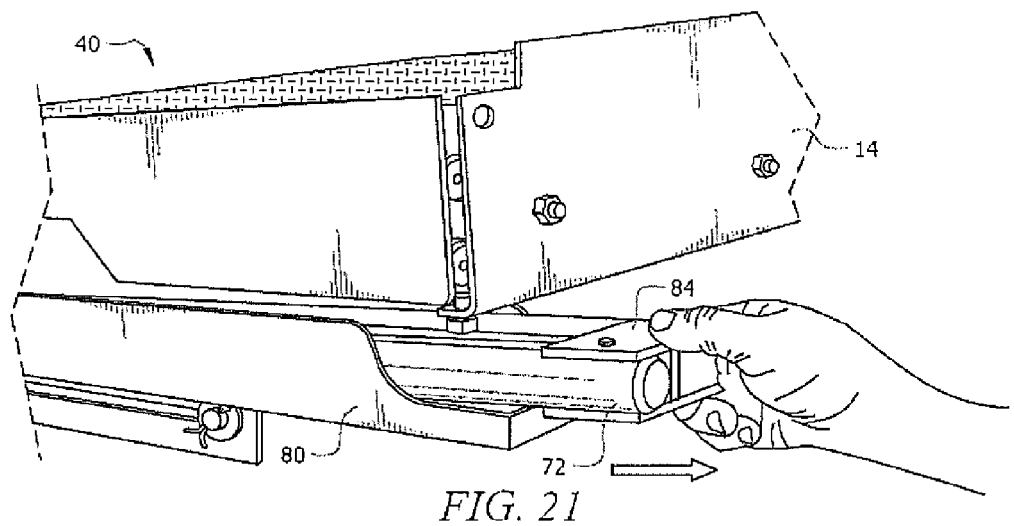
FIG. 21 is a perspective view of an exemplary embodiment of the foldable guardrail being removed from a storage tray disposed under the multi-stage extendable personnel platform according to the teachings of the present disclosure.
Figure 22:
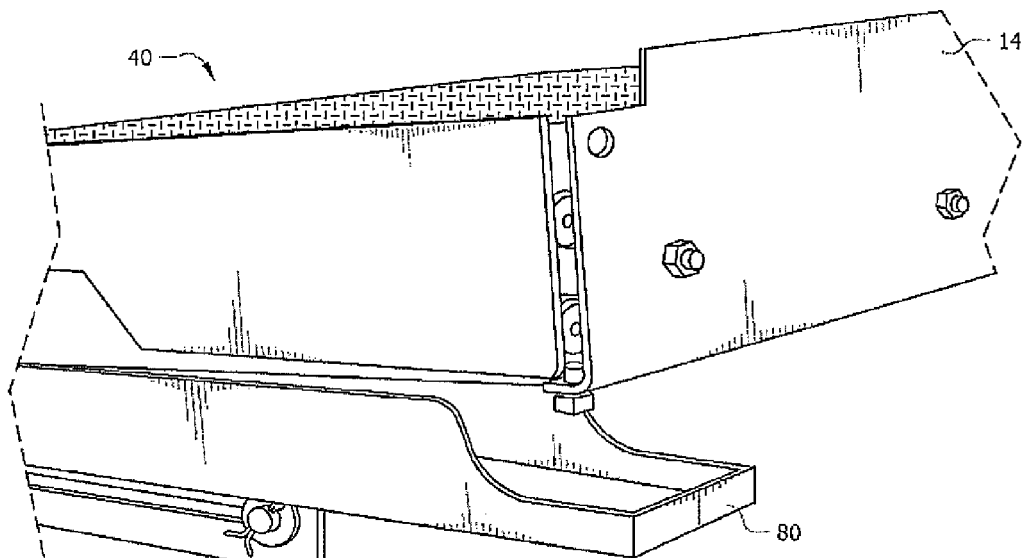
FIG. 22 is a perspective view of an exemplary embodiment of the storage tray for stowing the foldable guardrail disposed under the multi-stage extendable personnel platform according to the teachings of the present disclosure.

FIGS. 19 and 20 are perspective views of an exemplary embodiment of the foldable guardrail 70 in a stowed position under the multi-stage extendable personnel platform 40 according to the teachings of the present disclosure. As described above, a tray 80 in which the foldable guardrail 70 fits snugly is disposed below the deck 14 of the platform 40. The tray 80 incorporates sides that substantially enclose the foldable guardrail 70. At the end of the tray 80 where the rotation coupling 84 is placed, the sides are lower so that the foldable railing 70 can be lifted and pulled out of the tray 80 by a user, as shown in FIG. 21. FIG. 22 shows the tray 80 after the foldable railing 70 has been removed.

Because of the lack of clearance, the guardrail 70 cannot be removed from the storage tray while the personnel platform is in its stowed position. The personnel platform must be at least partially extended or deployed to allow adequate room above the tray for the guardrail to be removed. Because the personnel platform is securely latched in place when it is in its stowed position, the guardrail cannot be accidentally removed from the storage tray.

In operation, the user first deploys the extendable platform and the ladder accessory prior to removing the foldable guardrail 70 from the tray 80. The user may hook the hook members 88 and 89 disposed on the free end of the railing 76 to the anchor ring 90 on the personnel door, and then insert the free end of the post 72 into the opening 74 on the platform deck 14. The weight of the railing 76, the height of the anchor ring 90 on the door, and the length of the post 72 together cause the railing 76 and the post 72 to form a right angle (90 degrees).

To stow the platform and foldable railing, the user first removes the hook members from the anchor ring 90 by realigning the members 88 and 89 with the anchor ring 90, and pulling the hook members away from the anchor ring. It just takes a simple twist. The vertical post 72 may then be removed from the opening 74 in the deck 14. Thereafter, the ladder accessory may be retracted, and the platform pushed back under the truck bed. Everything is stored conveniently and easily out of the way.

Constructed in the manner described herein, the platform and the ladder and railing accessories provide a sturdy access route to the cargo compartment that can be easily deployed. When not in use, the platform and accessories are stowed out of the way and out of sight within a small confined mounting envelope. The platform mounting envelope is sized to be easily accommodated within the existing framework of the truck body so that no substantial alteration to the trailer is needed. The platform is also sized, configured, and rated for staging cargo via the personnel side door. Typically the trailers are filled to the maximum with cargo, leaving very little space for workers to stage the cargo for unloading.

The personnel platform and accessories may be installed on a cargo truck, as described herein, and also finds application with other forms of vehicles such as recreational vehicles, fire trucks, emergency vehicles, etc. where easy-deployable access for personnel is needed. The personnel platform and accessories may even be used on stationary structures where needed.

The features of the present invention which are believed to be novel are set forth below with particularity in the appended claims. However, modifications, variations, and changes to the exemplary embodiments described above will be apparent to those skilled in the art, and the cargo truck multi-stage extendable personnel platform with the foldable guardrail described herein thus encompasses such modifications, variations, and changes and are not limited to the specific embodiments described herein.

What is claimed is:

1. An extendable personnel platform with a foldable guardrail accessory for a cargo truck comprising:
    a mounting bracket securely fastened to a framing structure of the cargo truck beneath a personnel door disposed on one side of the cargo truck;
    a platform deck mounted to a sliding mechanism securely fastened to the mounting bracket, wherein the platform deck is operable to be slidably configured in a stowed position beneath the cargo truck and a deployed position extending substantially horizontally beyond the cargo truck along a first axis perpendicular to a longitudinal axis of the cargo truck;
    a latching mechanism operable to lock the platform deck in one of the stowed position and the deployed position;
    a multi-step stair accessory having at least two steps and slidably mounted beneath the platform deck, wherein the multi-step stair accessory is operable to be slidably configured in a stowed position beneath the platform deck and a deployed position extending substantially beyond the platform deck along a second axis perpendicular to the first axis and parallel to the longitudinal axis of the cargo truck, the platform deck and the multi-step stair accessory forming a L-shaped extension from a side of the cargo truck; and
    a guardrail accessory securely stowable under the platform deck, the guardrail accessory having first and second elongated members rotatably coupled together at one end, a free end of the first elongated member being adapted to secure to the platform deck to form a substantially vertical post, and a free end of the second elongated member being adapted to secure to the open personnel door to form a substantially horizontal guardrail.

2. The extendable personnel platform of claim 1, wherein the free end of the second elongated member of the guardrail accessory further comprises a pair of opposed and facing hook members adapted to secure to an anchor ring disposed on the personnel door.

3. The extendable personnel platform of claim 1, wherein the free end of the first elongated member of the guardrail accessory is adapted to be insertable into an opening formed in the platform deck.

4. The extendable personnel platform of claim 1, wherein the rotatable coupling between the first and second elongated members of the guardrail accessory enables the elongated members to rotate from zero to 180 degrees relative to one another.

5. The extendable personnel platform of claim 1, further comprising a tray disposed under the platform deck adapted for stowing the guardrail accessory.

6. The extendable personnel platform of claim 1, further comprising a ladder accessory having at least one step coupled to the platform deck.

7. The extendable personnel platform of claim 1, further comprising a ladder accessory having at least one step coupled to the platform deck and operable to be slidably configured in a stowed position beneath the platform deck and a deployed position extending beyond the platform deck.

8. The extendable personnel platform of claim 1, further comprising a release handle operable to release and lock the latching mechanism.

9. A extendable personnel platform comprising:
a mounting bracket securely fastened to a framing structure beneath a personnel door disposed on one side of the cargo truck;
a platform deck mounted to a sliding mechanism securely fastened to the mounting bracket, wherein the platform deck is operable to be slidably configured in a stowed position beneath the framing structure and a deployed position extending substantially horizontally beyond the personnel door along a first axis perpendicular to a longitudinal axis of the cargo truck, the platform deck being sized and rated for staging cargo via the personnel door;
a latching mechanism operable to lock the platform deck in one of the stowed position and the deployed position;
a ladder accessory having at least one step coupled to the platform deck slidably mounted beneath the platform deck, wherein the ladder accessory is operable to be slidably configured in a stowed position beneath the platform deck and a deployed position extending substantially beyond the platform deck along a second axis perpendicular to the first axis and parallel to the longitudinal axis of the cargo truck, the platform deck and the ladder accessory forming a L-shaped extension from a side of the cargo truck; and
a foldable guardrail accessory securely stowable under the platform deck.

10. The extendable personnel platform of claim 9, wherein the ladder accessory is operable to be slidably configured in a stowed position beneath the platform deck and a deployed position extending beyond the platform deck.

11. The extendable personnel platform of claim 9, wherein the ladder accessory comprises:
a ladder having a plurality of steps;
a pair of side rails coupled to the platform deck and defining a pair of elongated slots, the slots defining a detent at one end adapted to engage the ladder in a fully-stowed position, and a termination end adapted to engage the ladder in a fully-extended and lowered position.

12. The extendable personnel platform of claim 9, wherein the second elongated member of the guardrail accessory further comprises a pair of opposed and facing hook members adapted to secure to an anchor ring on the personnel door.

13. The extendable personnel platform of claim 9, wherein the free end of the first elongated member of the guardrail accessory is adapted to be insertable into an opening formed in the platform deck.

14. The extendable personnel platform of claim 9, wherein the rotatable coupling between the first and second elongated members of the guardrail accessory enables the elongated members to rotate from zero to 180 degrees relative to one another.

15. The extendable personnel platform of claim 9, further comprising a tray securely disposed under the platform deck adapted for stowing the guardrail accessory.

16. A stowable personnel platform for a cargo truck comprising:
a platform deck securely fastened to a frame structure of the cargo truck, wherein the platform deck is operable to be slidably configured in a stowed position under the cargo truck and a deployed position extending substantially horizontally beyond the cargo truck along a first axis perpendicular to a longitudinal axis of the cargo truck;
a latching mechanism operable to releasably lock the platform deck in one of the stowed position under the cargo truck and the deployed position extending beyond the cargo truck; and
a multi-step stair accessory having at least two steps and slidably mounted to the platform deck, wherein the multi-step stair accessory is operable to be slidably configured in a stowed position under the platform deck and a deployed position extending substantially beyond the platform deck along a second axis perpendicular to the first axis and parallel to the longitudinal axis of the cargo truck, the platform deck and the multi-step stair accessory forming a L-shaped extension from the cargo truck.

* * * * *